US007499442B2

(12) United States Patent
Welborn et al.

(10) Patent No.: US 7,499,442 B2
(45) Date of Patent: Mar. 3, 2009

(54) METHOD FOR SHARING BANDWIDTH USING REDUCED DUTY CYCLE SIGNALS

(75) Inventors: Matthew L. Welborn, Vienna, VA (US); William M. Shvodian, McLean, VA (US)

(73) Assignee: Freescale semiconductor, Inc., Austin, TX (US)

( * ) Notice: Subject to any disclaimer, the term of this patent is extended or adjusted under 35 U.S.C. 154(b) by 756 days.

(21) Appl. No.: 10/998,572

(22) Filed: Nov. 30, 2004

(65) Prior Publication Data

US 2006/0114879 A1 Jun. 1, 2006

(51) Int. Cl.
*H04B 7/212* (2006.01)
(52) U.S. Cl. .................................................. 370/347
(58) Field of Classification Search ......... 370/328–339, 370/347
See application file for complete search history.

(56) References Cited

U.S. PATENT DOCUMENTS

| 5,596,439 | A | 1/1997 | Dankberg et al. | |
|---|---|---|---|---|
| 6,895,059 | B2 * | 5/2005 | Rogerson et al. | 375/295 |
| 6,952,456 | B1 * | 10/2005 | Aiello et al. | 375/295 |
| 7,088,795 | B1 * | 8/2006 | Aiello et al. | 375/356 |
| 2002/0004407 | A1 | 1/2002 | Simonsson | |
| 2002/0105970 | A1 | 8/2002 | Shvodian | |
| 2003/0169697 | A1 * | 9/2003 | Suzuki et al. | 370/310 |

OTHER PUBLICATIONS

Welborn, Multiple Access Options for UWB WPANs, IEEE, pp. 1-21, Sep. 2002.*
Gondolfo et al, 802.15.3 Overview/Update, The WiMedia Alliance, 23 pages, Oct. 2002.*
Notification of Transmittal of the International Search Report and the Written Opinion of the International Searching Authority, or the Declaration from Patent Cooperation Treaty issued on Oct. 13, 2006 for the corresponding International patent application No. PCT/US05/042626.
Search Report from the Patent Cooperation Treaty issued on Oct. 13, 2006 for the corresponding International patent application No. PCT/US05/042626.
Written Opinion of the International Searching Authority from the Patent Cooperation Treaty issued on Oct. 13, 2006 for the corresponding International patent application No. PCT/US05/042626.

* cited by examiner

*Primary Examiner*—Frank Duong
(74) *Attorney, Agent, or Firm*—Posz Law Group, PLC

(57) ABSTRACT

A method is provided for transmitting data. A first device (121) generates a first signal (320) having a first duty cycle, comprising a first gated-on portion (323) and a first gated-off portion (363) in a time slot (260); and a second device (125) generates a second signal (330) having second duty cycle, comprising a second gated-on portion (333) and a second gated-off portion (363) in the same time slot (260). The first gated-on portion (323) is generated during a first segment of the time slot (260) and the first gated-off portion (363) is generated during a second segment of the time slot (260), while the second gated-on portion (333) is generated during the second segment and the second gated-off portion (363) is generated during the first segment. The first and second duty cycles are individually below 100%, and the sum of the first and second duty cycles is below 100%.

25 Claims, 5 Drawing Sheets

METHOD FOR SHARING BANDWIDTH USING REDUCED DUTY CYCLE SIGNALS

FIELD OF THE INVENTION

The present invention relates in general to time division multiple access (TDMA) signal transmission schemes, including those used for ultra wideband (UWB) systems. In particular the present invention relates to TDMA signal transmission schemes in which individual assigned time slots are broken up into smaller nominal time slots, each of which is assigned to multiple devices. A particular aspect of the present invention relates to a TDMA schemes in which multiple devices transmit at lower than a 100% duty cycle and two or more devices transmit during the same nominal time slot but have their signals interleaved with each other such that they do not interfere with those of the other device or devices. Another aspect of the present invention relates to the choosing of the characteristics of the nominal time slots and the transmitted signals such that transmissions from each device do not violate power limits imposed by various regulatory agencies.

BACKGROUND OF THE INVENTION

When operating wireless networks, a problem can occur when multiple networks or multiple devices want to operate over the same channel using the same bandwidth. Some sort of scheme must be implemented to separate the networks in some way so that transmissions from one will not interfere with transmissions from the other.

One option for handling multiple networks or devices is to use a frequency division multiple access (FDMA) scheme. Such an implementation is often used in narrow band systems. In an FDMA scheme, different networks or devices are separated by each being assigned a different frequency band. Each network or device then gets to use its assigned portion of the spectrum and can be assured that other networks will not interfere with that assigned frequency portion. An example of this is FM radio.

However, this is not readily applicable to a UWB implementation since UWB by its nature uses wide frequency bands for its signals. In fact with UWB systems, it is generally advantageous to use as wide a spectrum as possible for transmissions. Because of the need to use very wide frequency bands, it is sometimes not feasible to break up the available spectrum into smaller, mutually exclusive frequency bands.

Another option for handling multiple networks is to use a code division multiple access (CDMA) scheme. In a CDMA scheme networks and devices transmit over the same frequency spectrum and at the same time, but signals from each are encoded using codes specially chosen to minimize their interference with each other.

However this kind of a scheme also has limitations. First, there are only so many codes that have the desired isolation properties needed to keep overlapping networks and devices separate, thus limiting the number of networks or devices that can operate at the same time in a given area. Second, no matter how good the code separation is, it isn't perfect. There is always some bleed over into transmissions from other networks. As a result of this, a close device of a different network can often drown out a distant device of the same network, despite the fact that the codes used by the close device are chosen to minimize interference with the other network. This can be referred to as the near-far problem.

Yet another option for handling multiple networks is a time division multiple access (TDMA) scheme. In a TDMA scheme, the available transmission time is broken up into multiple time slots, and each network or device is assigned one or more of the time slots. Thus, each device is given some portion of the available transmission time to use and is forced to remain silent during all other times.

However, this TDMA scheme forces each network or device to reduce its speed, since it isn't allowed to transmit during the entire available channel time. And as the number of overlapping networks or devices increases, transmission speed will be correspondingly reduced. For example, if there is 100 megabits per second (Mbps) capacity divided evenly over four separate networks, each network would be limited to a 25 Mbps transmission speed.

One way to transmit more data in a TDMA scheme is to increase the transmission power for a given network or device. In a digital system, for example, using a stronger signal means that each individual bit of data requires less time to send, enabling the device to operate at an increased data rate. A significantly increased transmit power can, therefore, compensate for time lost when other networks or devices are transmitting.

However, this solution of increasing transmit power has limited application to UWB systems. In the United States the Federal Communications Commission (FCC) has imposed a limit on the maximum allowable transmit power for UWB signals. And there is every reason to believe that similar agencies in other countries will impose similar restrictions. This in turn represents a limit on the maximum capacity for the combination of all available networks.

Therefore, if a TDMA scheme is used for UWB signals, it would be desirable to maximize the transmit power used for any given signal, while minimizing that signal's width in the time domain. And it would be desirable to achieve this result without violating the maximum signal power restrictions set up by the FCC or similar regulating agency. This would allow each network or device to maximize its data transmit rate while minimizing the portion of available transmit time that it used.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Wireless Network

Figure 1:
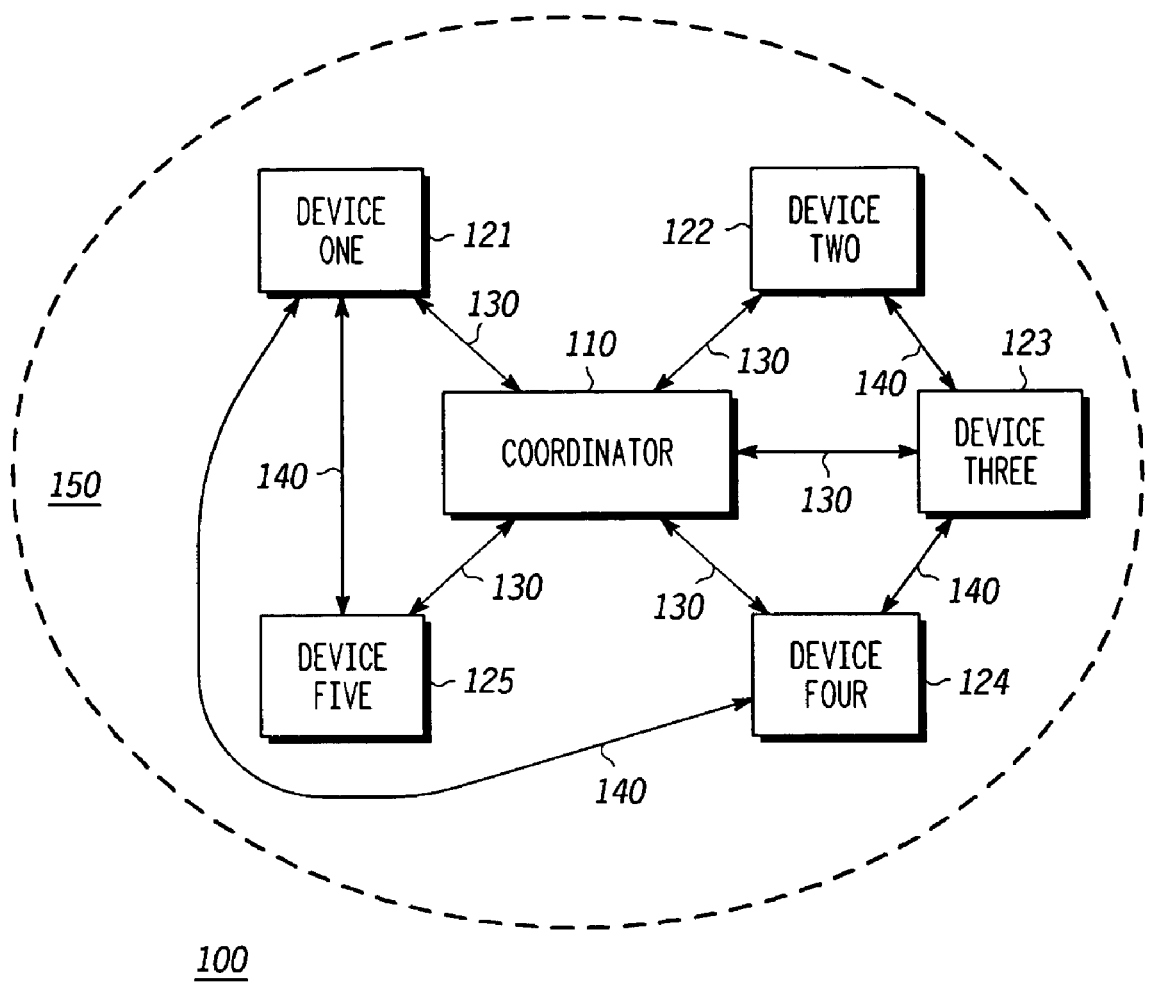
FIG. 1 is a block diagram of a wireless network according to a disclosed embodiment of the present invention.

FIG. 1 is a block diagram of a wireless network 100 according to a disclosed embodiment of the present invention. In this embodiment the network 100 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 1, the network 100 includes a coordinator 110 and a plurality of devices 121-125. The coordinator 110 serves to control the operation of the network 100. As noted above, the system of coordinator 110 and devices 121-125 may be called a piconet, in which case the coordinator 110 may be referred to as a piconet coordinator (PNC). Each of the non-coordinator devices 121-125 must be connected to the coordinator 110 via primary wireless links 130, and may also be connected to one or more other non-coordinator devices 121-125 via secondary wireless links 140, also called peer-to-peer links.

In addition, although FIG. 1 shows bi-directional links between devices, they could also be shown as unidirectional links. In this case, each bi-directional link 130, 140 could be shown as two unidirectional links, the first going in one direction and the second going in the opposite direction.

In some embodiments the coordinator 110 may be the same sort of device as any of the non-coordinator devices 121-125, except with the additional functionality for coordinating the system, and the requirement that it communicate with every device 121-125 in the network 100. In other embodiments the coordinator 110 may be a separate designated control unit that does not function as one of the devices 121-125.

In some embodiments the coordinator 110 will be a device just like the non-coordinator devices 121-125. In other embodiments the coordinator 110 could be a separate device dedicated to that function. Furthermore, individual non-coordinator devices 121-125 could include the functional elements of a coordinator 110, but not use them, functioning as non-coordinator devices. This could be the case where any device is a potential coordinator 110, but only one actually serves that function in a given network.

Each device of the network 100 may be a different wireless device, for example, a digital still camera, a digital video camera, a personal data assistant (PDA), a digital music player, or other personal wireless device.

The various non-coordinator devices 121-125 are confined to a usable physical area 150, which is set based on the extent to which the coordinator 110 can successfully communicate with each of the non-coordinator devices 121-125. Any non-coordinator device 121-125 that is able to communicate with the coordinator 110 (and vice versa) is within the usable area 150 of the network 100. As noted, however, it is not necessary for every non-coordinator device 121-125 in the network 100 to communicate with every other non-coordinator device 121-125.

Time Division Multiple Access (TDMA) Scheme

The available bandwidth in a given network 100 may be split up in time by the coordinator 110 into a series of repeated superframes. These superframes define how the available transmission time is split up among various tasks. Individual frames of data are then transferred within these superframes in accordance with the timing set forth in the superframe.

Figure 2:
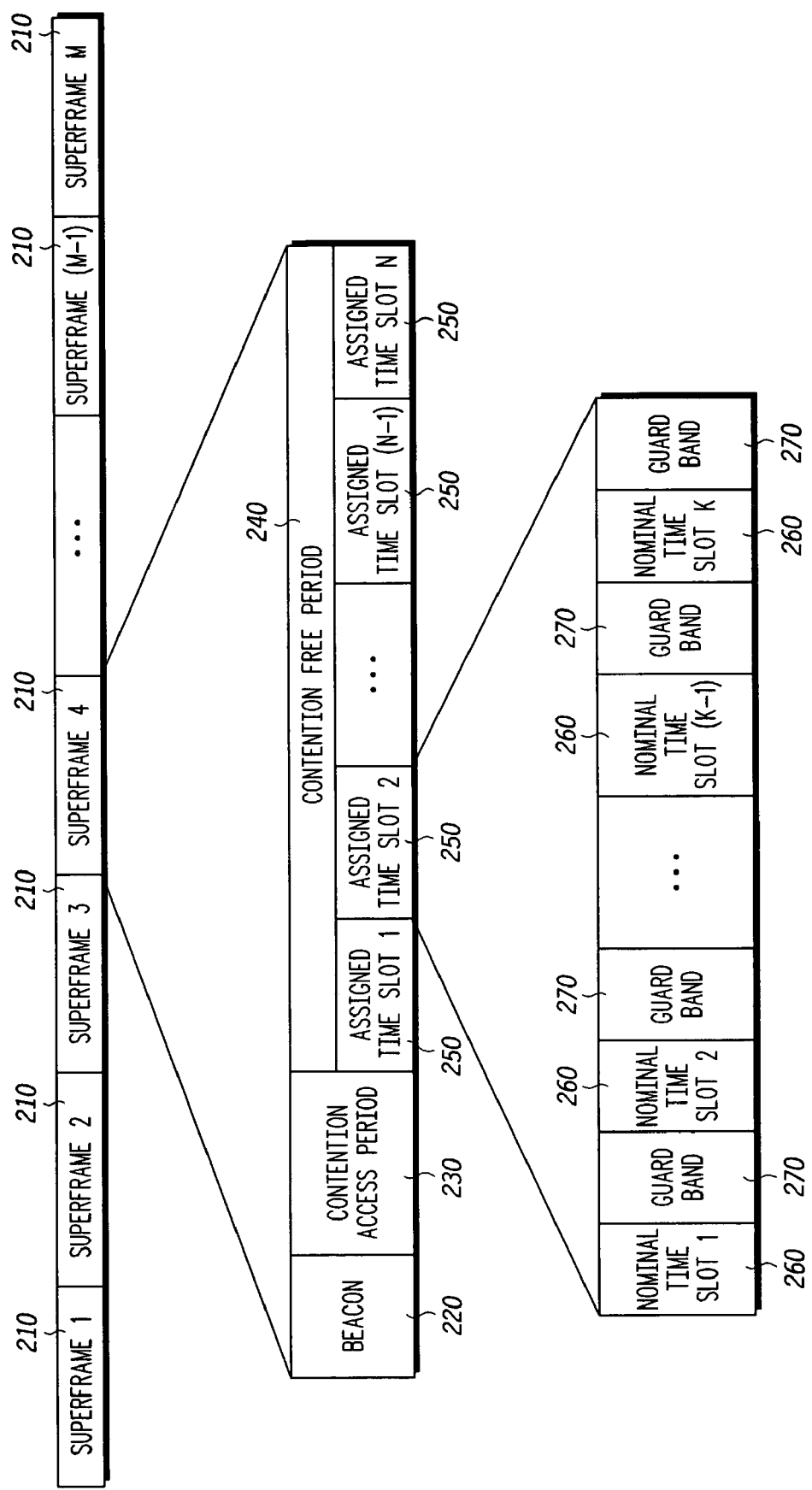
FIG. 2 is a block diagram of a TDMA scheme including superframes, time slots, and nominal slots, according to a disclosed embodiment of the present invention.

FIG. 2 is a block diagram of a TDMA scheme including superframes, time slots and nominal slots, according to a disclosed embodiment of the present invention. As shown in FIG. 2, the available transmission time 200 is broken up into a plurality of consecutive superframes 210. Each individual superframe 210 in this embodiment includes a beacon period 220, a contention access period (CAP) 230, and a contention free period (CFP) 240. The contention free period 340 is further broken up into a plurality of assigned time slots 250. Each assigned time slot may be further divided up into a plurality of nominal time slots 260.

The beacon period 220 is set aside for the coordinator 110 to send a beacon frame out to the non-coordinator devices 121-125 in the network 100. Such a beacon frame will include information for organizing the operation of devices within the superframe 210. Each non-coordinator device 121-125 knows how to recognize a beacon period 220 prior to joining the network 100, and uses the beacon 220 both to identify an existing network 100 and to coordinate communication within the network 100.

The beacon frame provides information required by the devices 121-125 in the network 100 regarding how the individual assigned time slots 250 and nominal time slots 260 will be allocated. In particular, it notes how and when devices 110, 121-125 can transmit to prevent any two devices from interfering.

The CAP 230 is used to transmit commands or asynchronous data across the network 100. The CAP 230 may be eliminated in many embodiments and the system would then pass commands solely during the CFP 240.

The CFP 240 includes a plurality of time slots 250. These time slots 250 are each assigned by the coordinator 110 to one or more transmitting devices 110, 121-125 and one or more receiving devices 110, 121-125 for transmission of information between them. Generally each transmitting device will have a single associated receiver, through in some cases a single transmitter will transmit to multiple receivers at the same time.

The time slots 250 are provided to allow communication between devices 120, 121-125. They do so in accordance with the information set forth in the beacon 220. The size of the time slots 250 can vary by embodiment, but it should be large enough to transmit one or more data frames.

As noted above, each time slot 250 may also be broken up into multiple nominal time slots 260. The nominal time slots 260 are set to be less than or equal to a nominal size. In one embodiment this nominal size is the length over which a regulatory body (such as the FCC) measures the power of a device 110, 121-125. However, in alternate embodiments the nominal size may be changed to any suitable value.

In a situation where the length of a nominal time slot 260 is equal to that of an assigned time slot 250, then the assigned time slot 250 would contain only a single nominal time slot 260, making the assigned time slot 250 equivalent to the single nominal time slot 260.

Although the embodiments described in this document are in the context of a WPAN (or piconet), it should be understood that the present invention also applies to other settings where bandwidth is to be shared among several users, such as, for example, wireless local area networks (WLAN), other appropriate wireless network, or any wired or wireless transmission scheme in which bandwidth must be shared.

The superframes 210 are fixed time constructs that are repeated in time. The specific duration of the superframe 210 is described in the beacon 220. In fact, the beacon 220 generally includes information regarding how often the beacon 220 is repeated, which effectively corresponds to the duration of the superframe 210. The beacon 220 also contains information regarding the network 100, such as the identity of the transmitters and receivers assigned to each assigned time slot 250 and each nominal time slot 260, the necessary transmission parameters for signals withing a nominal time slot 260, and the identity of the coordinator 110.

The system clock for the network 100 is preferably synchronized through the generation and reception of the beacons 220. Each non-coordinator device 121-125 will store a synchronization point time upon successful reception of a valid beacon 220, and will then use this synchronization point time to adjust its own timing.

Although not shown in FIG. 2, there may be guard times interspersed between assigned time slots 250 and between nominal time slots 260. Guard times are used in TDMA systems to prevent two transmissions from overlapping in time because of inevitable errors in clock accuracies and differences in propagation times based on spatial positions.

Nominal Time Slots

Figure 3:
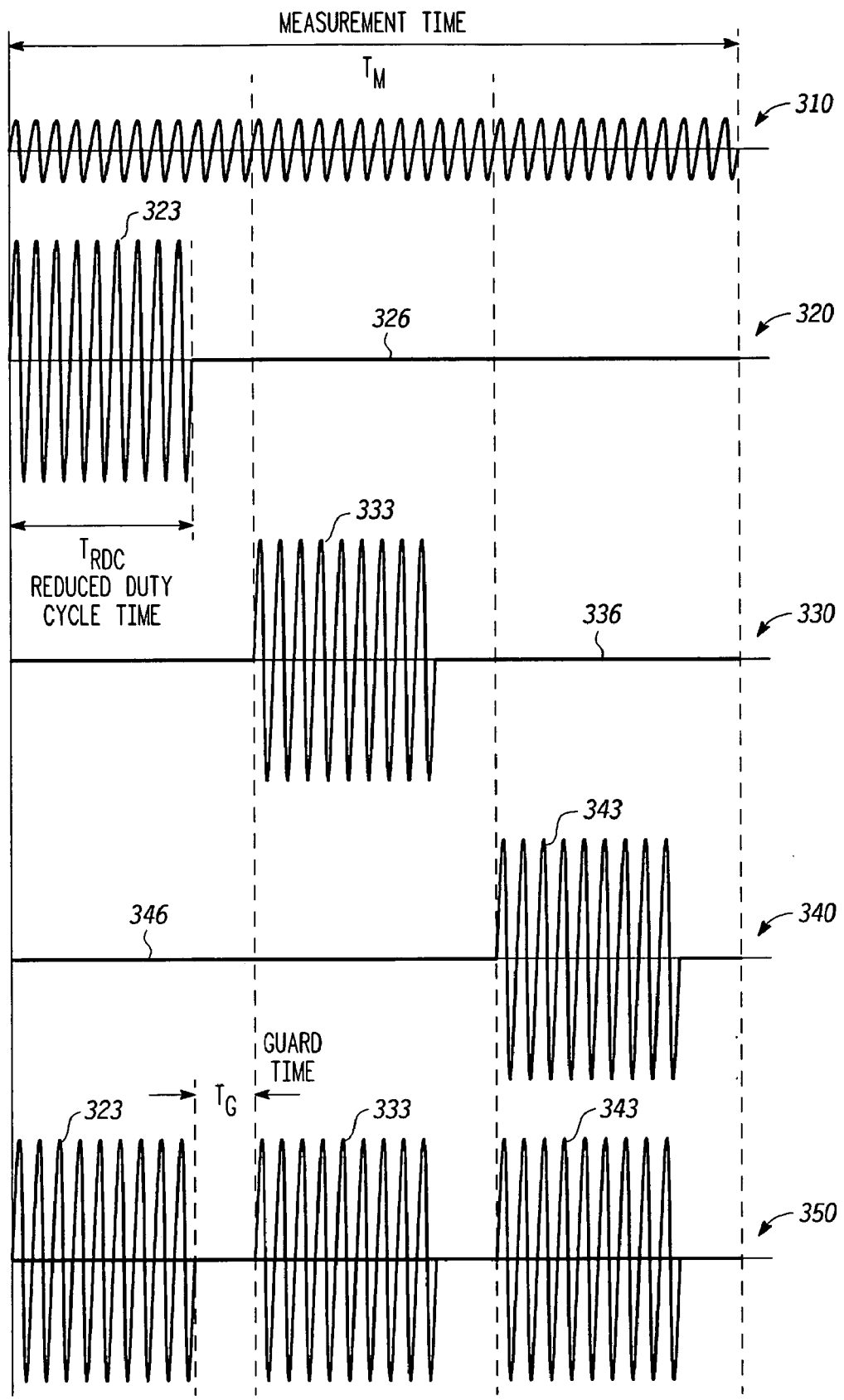
FIG. 3 is a signal diagram of An exemplary nominal slot according to a disclosed embodiment of the present invention.

FIG. 3 is a signal diagram of an exemplary nominal slot according to a disclosed embodiment of the present invention. The nominal time slot is formed to allow multiple devices to transmit during a single nominal time slot without any of them transmitting too much power.

As noted above, the FCC has imposed limits on the allowable transmit power for a given UWB device over a set measurement time $T_M$, as well as the allowable peak-to-average ratio. In particular, they have required that the average power of a UWB transmission (using root-mean-square averaging) must be below −41.3 dBm/MHz, averaged over 1 millisecond, and that the peak-to-average power must be below 0 dBm/50 MHz peak. In other words under these rules, the output power of a UWB device is measured in 1 microsecond blocks (corresponding to 1 MHz), but the measured power is averaged over one millisecond. Furthermore, this averaged output power must be 41.3 dB below a milliwatt. In addition, the highest peak power of this transmission must be below 1 milliwatt for any 50 MHz bandwidth window across the whole of the usable bandwidth. It is expected that regulatory agencies in other countries will impose similar restrictions.

One way to meet this maximum power limitation is to transmit a constant UWB signal 310 at 100% duty cycle over the measurement period $T_M$ (which is used to define the nominal time slot length in this embodiment), and set the power level of the constant UWB signal 310 such that it will not violate the power restrictions set forth by the relevant regulatory agency. However, given such a transmission scheme, the peak-to-average power ratio is likely to be relatively small compared to the regulated limit, e.g., only about 3:1. In other words, the device will not be transmitting at as high a peak-to-average ratio as it is allowed to.

Another way to meet the regulatory limitations is to have a first device transmit a first UWB signal 320 at a lowered duty cycle (i.e., below 100% duty cycle), including a first gated-on portion 323 (i.e., a non-zero portion including one or more wavelets) and a first gated-off portion 326 (i.e., a zeroed portion that includes no wavelets). As the duty cycle is reduced, the magnitude of the first gated-on portion 323 can be increased to maintain the same average power level (i.e., one that approaches but does not exceed the regulatory limit). The magnitude of the first gated-on portion 323 can then be increased (with a corresponding reduction in duty cycle) until any limit of peak-to-average ratio is reached. If no limit has been set on the peak-to-average ratio, then the lower limit on available duty cycle will likely be a hardware limit, i.e., how low the duty cycle can go and still have the signal function as required.

Now, since the first UWB signal 320 has a duty cycle lower than 100%, it includes the first gated-off portion 326 in part of the measurement time. During this first gated-off portion 326, the current device is not transmitting anything, leaving the transmission channel empty. This allows for a secondary TDMA scheme to be used within the measurement time duration, taking advantage of this first gated-off portion 326 during which no signals are transmitted. In this secondary TDMA scheme, one or more devices are allowed to transmit during the first gated-off portion 326.

For example, a second device can transmit a second UWB signal 330 also at a lowered duty cycle (i.e., below 100% duty cycle). This second UWB signal 330 will have a second gated-on portion 333 and a second gated-off portion 336, and will also meet the regulatory limitations regarding maximum power and peak-to-average ratio. The second gated-on portion 333 can then be arranged such that it overlaps the first gated-off portion 326, allowing for no interference between the two UWB signals 320 and 330.

Then, if there is space, additional devices can transmit additional UWB signals. For example, in the embodiment of FIG. 3, a third device transmits a third UWB signal 340, also at a lowered duty cycle (i.e., below 100% duty cycle). This third UWB signal 340 will have a third gated-on portion 343 and a third gated-off portion 346, and also meets the regulatory limitations regarding maximum power and peak-to-average ratio. The third gated-on portion 343 is arranged such that it overlaps the first gated-off portion 326 and the second gated-on portion 336, allowing for no interference between the three UWB signals 320, 330, and 340.

In addition, the gated-on portions 323, 333, and 343 can be arranged such that guard times $T_G$ are provided between adjacent gated-on portions. These guard times $T_G$ can prevent two adjacent gated-on portions from overlapping in time because of inevitable errors in clock accuracies and differences in propagation times based on spatial positions. And while shown to be a uniform value in all cases in this embodiment, in alternate embodiments the value of the guard time $T_G$ can be varied within a nominal time slot 260.

In the embodiment disclosed in FIG. 3, three devices transmit first through third UWB signals 320, 330, and 340, respectively, during a nominal time slot 260 defined in length by a measurement time $T_M$. Each UWB signal 320, 330, and 340 is transmitted at a 25% duty cycle, providing first through third gated-on portions 323, 333, and 343 having a duration equal to a reduced duty cycle time $T_{RDC}$ that is ¼ of the measurement time $T_M$. The first gated-on portion 323 is arranged such that it overlaps the second and third gated-off portions 336 and 346; the second gated-on portion 333 is arranged such that it overlaps the first and third gated-off portions 326 and 346; and the third gated-on portion 343 is arranged such that it overlaps the first and second gated-off portions 326 and 336. A guard time $T_G$ is provided between each gated-on portion 323, 333, and 343.

As a result of this, when the first through third UWB signals 320, 330, and 340 are transmitted at the same time, they form a combined and interleaved UWB signal 350 filling the available transmission medium. However, since the first through third gated-on portions 323, 333, and 343 are arranged such that they don't overlap, the three devices can transmit during the same nominal time slot 260 (i.e., over the same measurement time $T_M$) without interfering with each other.

And if the measurement time $T_M$ is chosen to be less than or equal to the measurement time used by the appropriate regulatory agency to measure maximum allowable transmit power, then all of the first through third UWB signals 320, 330, and 340 will be compliant with power restrictions if they keep their individual total power values below the regulatory threshold.

Furthermore, since the nominal time slot 260 is the smallest increment into which the available channel time is divided, if two or more devices are assigned to transmit during the same nominal time slot 260, they are effectively transmitting at the same time since neither precludes the other from transmitting. In this way both devices can use the entire available channel bandwidth without interfering.

Although FIG. 3 discloses an embodiment in which three devices each transmit during a measurement time $T_M$ (i.e., a nominal time slot 260) at a 25% duty cycle, alternate embodiments can alter the number of transmitting devices and the precise duty cycles chosen. For example the nominal time slot 260 may be split between only two devices or more than three devices.

Furthermore, the separate UWB signals 320, 330, 340 need not have the same duty cycle. All that is required is that each device transmit at a duty cycle less than 100% (i.e., each device allows for some gated-off portion), and that the sum of all of the duty cycles be less than or equal to 100% (i.e., the total size of gated-on portions is such that they can be arranged not to overlap). And if guard times $T_G$ are to be used, the available total duty cycle allowed for gated-on portions will have to be reduced by an appropriate amount to provide for the guard times $T_G$.

It should be noted that in this embodiment the size of a nominal time slot 260 is determined by the measurement time $T_M$ employed by the relevant regulatory agency. For example, the FCC has currently set a measurement time $T_M$ of one millisecond. However, they could change this measurement time $T_M$, or other agencies in other jurisdictions could use a different value. Regardless, the size of the nominal time slot 260 can be varied accordingly, with the amount of wavelets in the relevant gated-on portions 323, 333, 343 being higher or lower accordingly.

Alternate embodiments could employ a nominal time slot 260 greater in size than the regulatory measurement time $T_M$. However, in order to meet the regulatory total power requirements, it will be necessary to further reduce allowable duty cycles such that no UWB transmission violates the power limits.

Furthermore, although FIG. 3 shows only a repeated sine wave for each portion of the various UWB signals 310, 320, 330, and 340, this is by way of example only. In different embodiments the UWB signals can include different wavelet shapes, different numbers of wavelets, and the wavelets can be encoded with digital data. However, the selection of duty cycle and orientation of gated on and gated off portions will be analogous to the procedure shown with respect to FIG. 3.

Figure 4:
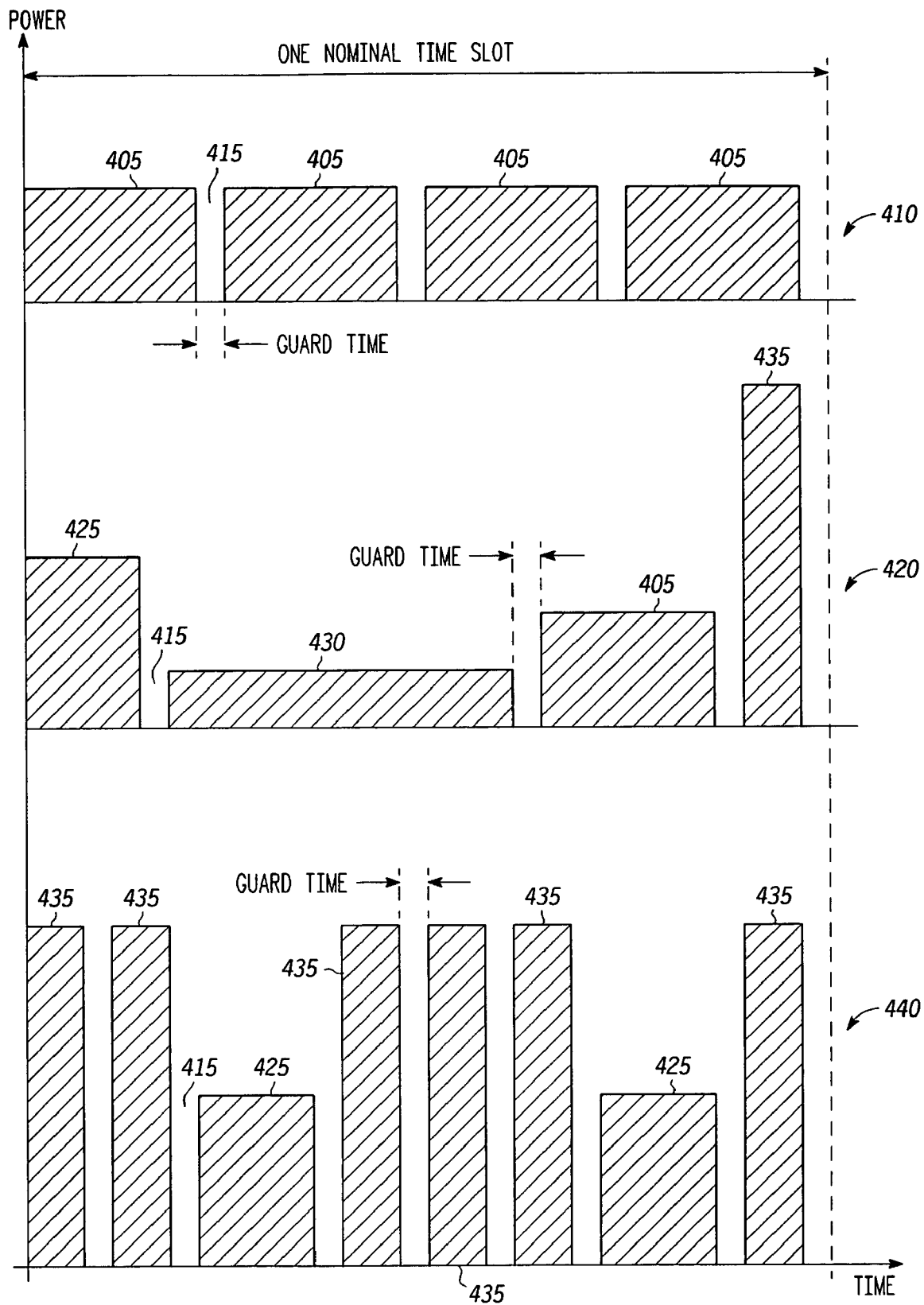
FIG. 4 is a block diagram of different implementations of nominal slots, according to disclosed embodiments of the present invention.

FIG. 4 is a block diagram of different implementations of nominal slots, according to disclosed embodiments of the present invention. The block diagram of FIG. 4 represents the cumulative power of a given signal by a shaded box. As a result, this diagram shows only the gated-on portions of respective UWB signals.

As shown in FIG. 4, the size and shape of gated-on portions can vary within a single nominal time slot. FIG. 4 shows three exemplary nominal time slots 410, 420, and 440.

A first exemplary nominal time slot 410 includes four identical first gated-on portions 405 arranged in an interleaved fashion such that each has a guard time 415 separating it from any other first gated-on portion 405.

A second exemplary nominal time slot 420 includes different first through fourth gated-on portions 405, 425, 430, and 435. Each of these gated-on portions 405, 425, 430, and 435 is designed to have a duty cycle and maximum power such that it has as great a total power over the length of the nominal time slot 420 as possible, while not violating any regulatory requirements of total power or peak-to-average ratio.

One possible reason for the variety in the gated-on portions 405, 425, 430, and 435 may be the evolution of UWB devices. In an early implementation it may be that the UWB signals can only be made to be a set minimum duty cycle. But as UWB technology advances, smaller duty cycles, higher power signals can be implemented. The present invention will accommodate this, since the individual UWB signals need not be identical to operate within a nominal time slot 260. Older UWB signals can be transmitted alongside new UWB signals provided they are arranged not to overlap their gated-on portions.

In fact a third exemplary nominal time slot 440 shows that as duty cycles are reduced, and the gated-on portions 425 and 435 of the UWB signals are reduced in width, a greater number of UWB signals can be fit into the same nominal time slot 260. In the third exemplary nominal time slot 440 shown in FIG. 4, eight separate gated-on portions 425 and 435 from eight separate UWB signals are shown. In this way eight separate devices could transmit during the same nominal time slot 260.

System Operation

The use of nominal time slots can be particularly effective when a local network has a neighbor network or a child network to accommodate. Because they are so close in space, neighbor networks or parent/child networks must share an available channel with a local network. Under normal circumstances, this means that each of the network networks (local, neighbor, child) must accept a fraction of the available channel time in order to avoid interfering. However, by using interleaved, reduced duty cycle UWB transmissions in nominal time slots, it is possible for each network to effectively use all or most of the available channel time.

Figure 5:
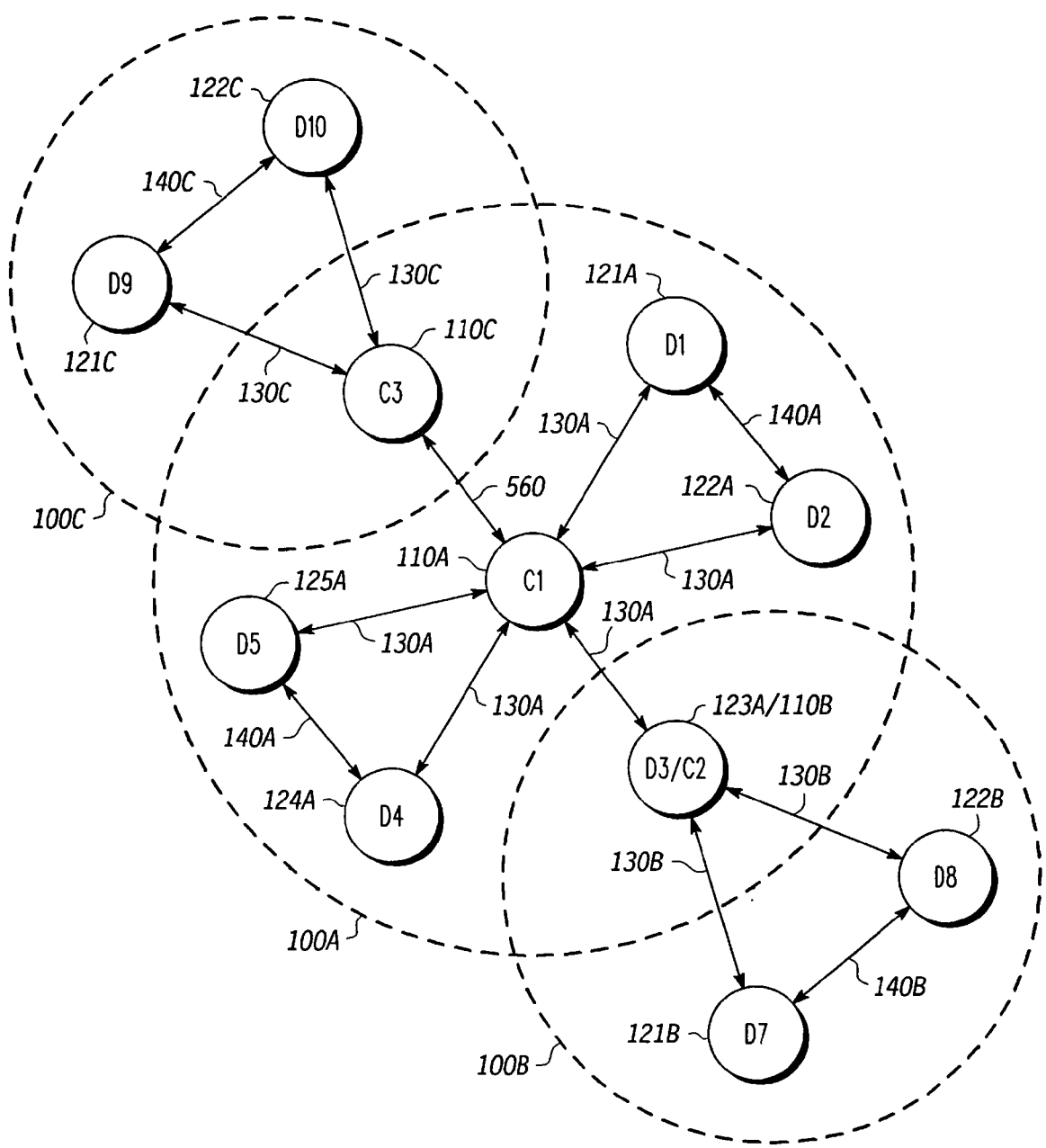
FIG. 5 is a block diagram of a local network having associated child and neighbor networks, according to a disclosed embodiment of the present invention.

FIG. 5 is a block diagram of a local network having associated child and neighbor networks, according to a disclosed embodiment of the present invention. As shown in FIG. 5, a local network 100*a* is provided with a child network 100*b* formed around a device in the local network 100*a*, and a neighbor network 100*c* formed adjacent to the local network 100*a*.

The local network 100*a* includes a local coordinator 110*a*, and first through fifth local non-coordinator devices 121*a*-125*a*. As noted above with respect to FIG. 1, the local coordinator 110*a* communicates with each of the local non-coordinator devices 121*a*-125*a* via primary local wireless links 130*a*, while the local non-coordinator devices 121*a*-125*a* communicate with each other via secondary local wireless links 140*a*.

The child network 100*b* includes a child coordinator 110*b*, and first and second child non-coordinator devices 121*b* and 122*b*. In this example, the child coordinator 110*b* is the same as the third local device 123*a*. As noted above with respect to FIG. 1, the child coordinator 110*b* communicates with the child non-coordinator devices 121*b* and 122*b* via primary child wireless links 130*b*, while the child non-coordinator devices 121*b* and 122*b* communicate with each other via secondary child wireless links 140*b*.

The neighbor network 100c includes a neighbor coordinator 110c, and first and second neighbor non-coordinator devices 121c and 122c. As noted above with respect to FIG. 1, the neighbor coordinator 110c communicates with the neighbor non-coordinator devices 121c and 122c via primary neighbor wireless links 130c, while the neighbor non-coordinator devices 121c and 122c communicate with each other via secondary neighbor wireless links 140c. In addition, the neighbor coordinator 110c communicates with the local coordinator 110a through a tertiary wireless link 560.

This exemplary set of overlapping networks illustrates several situations in which interleaved, reduced duty cycle UWB signals in nominal time slots can be used to share a channel.

One way to share a channel is between devices in a single network. Using a conventional TDMA scheme, if first and second local devices 121a and 122a wanted to pass data, and fourth and fifth local devices 124a and 125a wanted to pass data, they would each have to do so in different assigned time slots 250 to avoid interfering with each other. However, using the reduced duty cycle transmissions described above, each device pair in the above example could be assigned a different position in a nominal time slot 260, and the two transmissions could take place during the same assigned time slot 250.

For example, the first and second local devices 121a and 122a could be assigned a first position in a nominal time slot 260 for transmitting gated-on portions of reduced duty cycle UWB signals, while the fourth and fifth local devices 124a and 125a could be assigned a second position in a nominal time slot 260 for transmitting gated-on portions of reduced duty cycle UWB signals. If the time slot were arranged as shown by way of example in FIG. 3, the first position could correspond to the first UWB signal 320 and the second position could correspond to the second UWB signal 330.

Similarly, the channel can be shared between devices in parent and child networks. Using a conventional TDMA scheme, if first and second local devices 121a and 122a wanted to pass data, and first and second child devices 121b and 122b wanted to pass data, they would have to do so in different assigned time slots 250 to avoid interfering with each other. However, using the reduced duty cycle transmissions described above, each device pair in the above example could be assigned a different position in a nominal time slot 260, and the two transmissions could take place during the same assigned time slot 250.

As above, the first and second local devices 121a and 122a could be assigned a first position in a nominal time slot 260 for transmitting gated-on portions of reduced duty cycle UWB signals, while the first and second child devices 121b and 122b could be assigned a second position in a nominal time slot 260 for transmitting gated-on portions of reduced duty cycle UWB signals. Again, if the time slot were arranged as shown by way of example in FIG. 3, the first position could correspond to the first UWB signal 320 and the second position could correspond to the second UWB signal 330.

Likewise, the channel can be shared between devices in neighbor networks. Using a conventional TDMA scheme, if first and second local devices 121a and 122a wanted to pass data, and first and second neighbor devices 121c and 122c wanted to pass data, they would have to do so in different assigned time slots 250 to avoid interfering with each other. However, using the reduced duty cycle transmissions described above, each device pair in the above example could be assigned a different position in a nominal time slot 260, and the two transmissions could take place during the same assigned time slot 250.

As above, the first and second local devices 121a and 122a could be assigned a first position in a nominal time slot 260 for transmitting gated-on portions of reduced duty cycle UWB signals, while the first and second neighbor devices 121c and 122c could be assigned a second position in a nominal time slot 260 for transmitting gated-on portions of reduced duty cycle UWB signals. Again, if the time slot were arranged as shown by way of example in FIG. 3, the first position could correspond to the first UWB signal 320 and the second position could correspond to the second UWB signal 330.

In any of these cases, all that would be required to arrange a proper sharing of the channel time would be for all of the coordinators 110a, 110b, and 110c to pass information regarding which network and which devices were assigned which positions within a nominal time slot 260.

In fact, in some embodiments it would be possible to have all four transmissions (two within the local network 100a, one within the child network 100b, and one within the neighbor network 100c) take place at once, providing the nominal time slots 260 could accommodate four interleaved UWB signals.

Although the above examples are shown as being related to a wireless channel, alternate embodiments can apply to any situation in which a limited data channel must be shared among multiple devices or networks.

Also, although the above examples are shown as being used with UWB signals, this scheme is also applicable to any TDMA transmission scheme.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of coordinating the transmission of data, comprising:
    dividing an available transmission channel into a plurality of nominal time slots;
    assigning a first device to generate a first reduced duty cycle signal comprising a first gated-on portion and a first gated-off portion in a first nominal time slot selected from the plurality of nominal time slots, such that the first gated-on portion is generated during a first segment of the first nominal time slot and that the first gated-off portion is generated during a second segment of the first nominal time slot; and
    assigning a second device to generate a second reduced duty cycle signal comprising a second gated-on portion and a second gated-off portion in the first nominal time slot such that the second gated-on portion is generated during the second segment of the first nominal time slot and that the second gated-off portion is generated during a first segment of the first nominal time slot, wherein the first reduced duty cycle signal has a first duty cycle below 100%, wherein the second reduced duty cycle signal has a second duty cycle below 100%, wherein the sum of the first and second duty cycles is less than or equal to 100%, wherein a first total transmit power for the first reduced duty cycle signal divided by a length of the first nominal time slot is below a regulatory power threshold, wherein a second total transmit power for the second reduced duty cycle signal divided by the length of the first nominal time slot is below the regulatory power threshold, and wherein at least a one of the first total transmit power divided by a length of the first segment of the first nominal time slot, or the second total transmit power divided by a length of the second segment of the first nominal time slot is greater than the regulatory power threshold.

2. A method of coordinating the transmission of data, as recited in claim 1, further comprising:

assigning a third device to generate a third reduced duty cycle signal comprising a third gated-on portion and a third gated-off portion in the first nominal time slot such that the third gated-on portion is generated during a third segment of the first nominal time slot and that the third gated-off portion is generated during the first and second segments of the first nominal time slot, wherein the third reduced duty cycle signal has a third duty cycle below 100%, wherein the sum of the first, second, and third duty cycles is less than or equal to 100%, and wherein a third total transmit power for the third reduced duty cycle signal divided by the length of the first nominal time slot is below the regulatory power threshold, and wherein at least a one of the first total transmit power divided by a length of the first segment of the first nominal time slot, the second total transmit power divided by a length of the second segment of the first nominal time slot is greater than the regulatory power threshold, or the third total transmit power divided by a length of the third segment of the first nominal time slot is greater than the regulatory power threshold.

3. A method of coordinating the transmission of data, as recited in claim 1, wherein the first and second gated-on portions are separated by a guard band.

4. A method of coordinating the transmission of data, as recited in claim 3, wherein the guard band is between 30 nanoseconds and 10 microseconds.

5. A method of coordinating the transmission of data, as recited in claim 1, wherein the nominal time slot has a length between 1 microsecond and 2 milliseconds.

6. A method of coordinating the transmission of data, as recited in claim 1, wherein the first and second duty cycles are equal.

7. A method of coordinating the transmission of data, as recited in claim 1, wherein the first and second duty cycles are different.

8. A method of coordinating the transmission of data, as recited in claim 1, wherein the first and second devices have one of the following relationships: the first and second devices are in the same network, the first device is in a parent network and the second device is in a child network; and the first and second devices are in neighboring networks.

9. A method of coordinating the transmission of data, as recited in claim 1, wherein the method is implemented in an integrated circuit.

10. A method of coordinating the transmission of data, as recited in claim 1, wherein the method is implemented in an ultrawide bandwidth device.

11. A method of coordinating the transmission of data:

dividing an available transmission channel into a plurality of nominal time slots;

assigning first through $N^{th}$ devices to generate first through $N^{th}$ reduced duty cycle signals, respectively, in a first nominal time slot selected from the plurality of nominal time slots, the first through $N^{th}$ reduced duty cycle signals comprising a first through $N^{th}$ gated-on portions and first though $N^{th}$ gated-off portions, respectively, wherein the first through $N_{th}$ reduced duty cycle signals have first through $N^{th}$ duty cycles, wherein the first through $N^{th}$ duty cycles are all below 100%, wherein the sum of the first through $N^{th}$ duty cycles is less than or equal to 100%, wherein each of the first through $N^{th}$ reduced duty cycle signals are instructed to be transmitted such that none of the first through $N^{th}$ gated-on portions overlap, wherein N is an integer greater than 1, wherein first though $N^{th}$ total transmit power values for the first through $N^{th}$ reduced duty cycle signals divided by a length of the first nominal time slot are each below a regulatory power threshold, and wherein at least a one of the $N^{th}$ total transmit power divided by a length of a corresponding $N^{th}$ gated-on portion is greater than the regulatory power threshold.

12. A method of coordinating the transmission of data, as recited in claim 11, wherein N is between 3 and 12.

13. A method of coordinating the transmission of data, as recited in claim 11, wherein the first through $N^{th}$ gated-on portions are each separated by a guard band.

14. A method of coordinating the transmission of data, as recited in claim 12, wherein the guard band is between 30 nanoseconds and 10 microseconds.

15. A method of coordinating the transmission of data, as recited in claim 11, wherein the nominal time slot has a length between 1 microsecond and 2 milliseconds.

16. A method of coordinating the transmission of data, as recited in claim 11, wherein the first through $N^{th}$ duty cycles are of equal length.

17. A method of coordinating the transmission of data, as recited in claim 11, wherein the method is implemented in an integrated circuit.

18. A method of coordinating the transmission of data, as recited in claim 11, wherein the method is implemented in an ultrawide bandwidth device.

19. A method of transmitting a signal at a local device, comprising:

receiving control information from a remote device, the control information indicating a nominal time slot assigned to the local device, and a first segment of the nominal time slot assigned to the local device;

generating a signal having a duty cycle lower than 100% within the nominal time slot, the signal including a gated-on portion and a gated-off portion;

transmitting the signal such that the gated-on portion is transmitted in the first segment of the nominal time slot, wherein the signal meets a regulatory peak-to-average threshold criteria across a length of the nominal time slot, wherein the signal meets a regulatory average power criteria across the length of the nominal time slot, and wherein the signal does not meet at the regulatory average power criteria across a length of the gated-on portion.

20. A method of transmitting a signal at a local device, as recited in claim 19, wherein the peak-to-average threshold criteria is met if the peak-to-average power of the signal is below 0 dBm/50MHz.

21. A method of transmitting a signal at a local device, as recited in claim 19, wherein the average power criteria is met if the average power of the signal is below −41.3 dBm/MHz.

22. A method of transmitting a signal at a local device, as recited in claim 19, wherein the duty cycle is 50% or lower.

23. A method of transmitting a signal at a local device, as recited in claim 19, wherein the nominal time slot has a length between 1 microsecond and 2 milliseconds.

24. A method of transmitting a signal at a local device, as recited in claim 19, wherein the method is implemented in an integrated circuit.

25. A method of transmitting a signal at a local device, as recited in claim 19, wherein the method is implemented in an ultrawide bandwidth device.

\* \* \* \* \*